Sept. 24, 1935.   J. M. BEAUMONT   2,015,212
DEVICE FOR THE HYDRAULIC TRANSMISSION OF POWER
Filed Dec. 23, 1932

Inventor,
John M. Beaumont
By Eugene E. Stevens, Atty

Patented Sept. 24, 1935

2,015,212

UNITED STATES PATENT OFFICE 2,015,212

DEVICE FOR THE HYDRAULIC TRANSMISSION OF POWER

John Murray Beaumont, Huddersfield, England

Application December 23, 1932, Serial No. 648,677
In Great Britain December 23, 1931

1 Claim. (Cl. 60—54)

The invention relates to hydraulic "clutches" or devices for the hydraulic transmission of power of the type in which a bladed member fast on a driving shaft rotates within a casing containing liquid which, by centrifugal action, causes rotation of another bladed member fast on a shaft to be driven.

In order that a braking action may be exerted on the driven shaft, or the direction of rotation of said shaft be reversed, it has been proposed to place, between the driving and driven bladed members, a third bladed member which can be permitted to rotate freely, or the rotation of which can be retarded or completely stopped and thus effect a slowing down, stoppage or reversal of the direction of rotation of the driven member.

It is to apparatus comprising three bladed members as just described that my invention relates, and it has for its object to improve upon the construction previously proposed.

According to the invention, the third, or centrally disposed bladed member has its periphery formed as or provided with an annular ring or drum which is encircled by a brake band or has some other braking means associated with it whereby its rotation can be retarded or completely arrested. The peripheral ring portion of the central bladed member has secured to it the divided halves of a casing which encloses the driving and driven bladed members, the said casing portions being supported in suitable bearings concentric with the driving and driven shafts and being provided respectively with stuffing boxes through which the driving and driven shafts pass.

Figure 1:
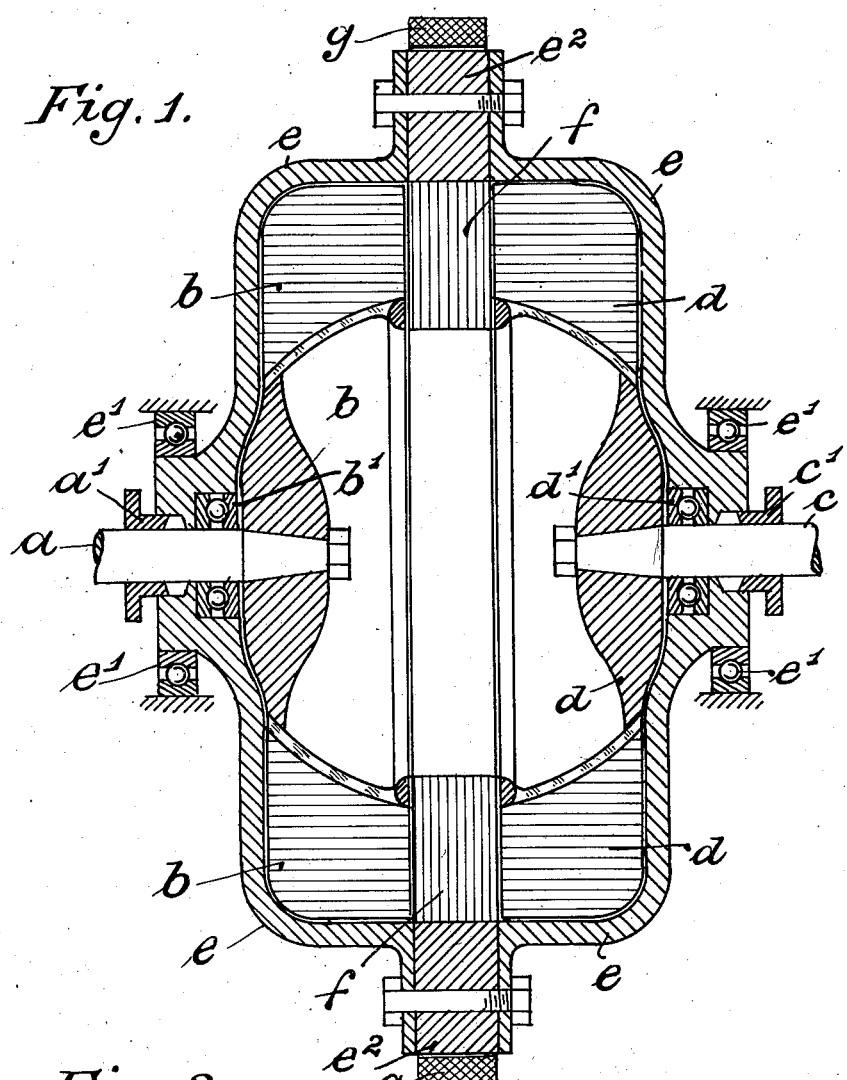
Figure 2:
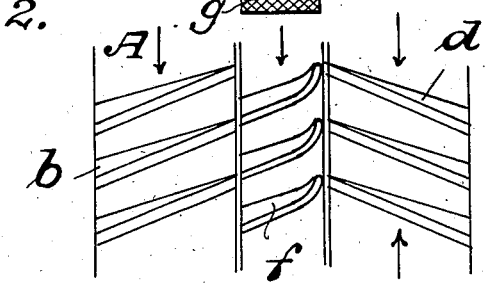

The accompanying drawing illustrates at Fig. 1, in sectional elevation and more or less diagrammatically, a hydraulic clutch according to my invention;

Fig. 2 being a detail elevation of portions of the three bladed members, which will facilitate the understanding of the operation of the intermediate member and its effect upon the driven member.

Referring to the drawing $a$ represents a driving shaft carrying an internally bladed member $b$, and $c$ a driven shaft carrying an internally bladed member $d$. A casing $e$, enclosing the members $b$ and $d$, is formed internally with a bladed portion $f$ which is disposed intermediate of the members $b$ and $d$.

Thrust bearings $b'$ and $d'$ are provided for the members $b$ and $d$ and stuffing boxes $a'$ and $c'$ prevent leakage around the driving and driven shafts. Suitable bearings $e'$ and $e'$ are provided to support the casing $e$.

The casing $e$ is formed or provided with an annular ring $e^2$ which is adapted to be engaged by a brake band $g$.

The blades of the driving member $b$ and intermediate member $f$ are arranged at suitable angles as shown, whilst those of the driven member $d$ may be disposed angularly as shown, or may be parallel with the axis of the said member. The blades of any or all the three members may be curved if preferred.

Liquid thrown out centrifugally from the central part of the casing into the spaces between the blades of the driving member $b$, is caused by the angular disposition or curvature of the said blades to travel laterally into the spaces between the blades of the freely rotatable intermediate member $f$ and so to act upon such blades that the intermediate member is driven. In similar manner the liquid is caused to travel laterally from the intermediate member to the driven member $d$ and so to act upon the blades of the latter as to transmit motion to it. Assuming the load on the driven member to be within the capacity of the driver, the three members will, by centrifugal action, be caused to rotate uniformly.

If, however, by means of the brake device the rotation of the intermediate member $f$ is retarded, the action of the liquid emerging therefrom upon the blades of the driven member $d$ will be such as to slow down the rotation of the driven member, whilst if the rotation of the intermediate member is retarded beyond a determined point, or is completely arrested, the direction of flow of the streams of liquid emerging therefrom will be such as either to stop rotation of the member $d$ or cause the direction of its rotation to be reversed. This will be understood from the detail given at Fig. 2. Assuming the driving member to be rotating in the direction of the arrow A, all three members will, so long as the intermediate member is left free, rotate in the same direction. If motion of the intermediate member is retarded the streams of liquid emerging from between its blades commence to slow down rotation of the member $d$ and if movement of the member $f$ is retarded beyond a certain point or is completely stopped, the member $d$ is first stopped and then the direction of its rotation reversed.

The device thus provides a brake and a reverse drive for a driven shaft both controlled by a single member, and it functions as an automatic or self-acting gear changer for the reason that if the load imposed on the driven shaft increases beyond the capacity of the driver, the driven member "slips" with relation to the intermediate member. The device has also the important advantage that it is noiseless in action, since it embodies no meshing gear wheels.

The term bladed member is intended to include a disc or block having inclined and/or curved passages formed through it.

Having thus described my invention, what I claim as new and desire to secure by Letters Patent is:—

A hydraulic clutch of the class described comprising a two part housing supported in aligned bearings, a peripheral internally bladed ring disposed between and secured to the two parts of the housing, a bladed driving member disposed in one part of the housing at one side of said bladed ring and immediately adjacent the same, a drive shaft supporting said bladed drive member, said housing providing an end thrust bearing and a stuffing box for said drive shaft, both said bearing and said stuffing box being disposed concentrically with said housing supporting bearing, a bladed driven member in the other part of the housing at the opposite side of said bladed ring and immediately adjacent the same, a drive shaft carried by said second part of the housing and supporting said driven member, a thrust bearing and stuffing box for said driven shaft similar to said first described thrust bearing and stuffing box, a brake element positioned to engage the periphery of said internally bladed ring to vary the speed of rotation of the same, and the blades of said ring being rearwardly inclined in the direction of the bladed driven member whereby the speed imparted to the driven member is varied when the speed of rotation of said ring is varied by said brake and whereby the driven member will be reversed when the bladed ring is stopped by said brake

JOHN M. BEAUMONT.